United States Patent [19]

Morikawa

[11] Patent Number: 4,860,711
[45] Date of Patent: Aug. 29, 1989

[54] ENGINE WITH VARIABLE COMPRESSION RATIO

[75] Inventor: Koji Morikawa, Tokyo, Japan

[73] Assignee: Fuji Jukogyo Kabushiki Kaisha, Tokyo, Japan

[21] Appl. No.: 252,584

[22] Filed: Oct. 3, 1988

[30] Foreign Application Priority Data

Oct. 9, 1987 [JP] Japan .................. 62-255913

[51] Int. Cl.[4] ............................. F02B 75/04
[52] U.S. Cl. .................... 123/48 D; 123/425
[58] Field of Search ............ 123/48 R, 48 A, 48 AA, 123/48 D, 78 D, 425

[56] References Cited

U.S. PATENT DOCUMENTS 4,469,055 9/1984 Caswell ..................... 123/78 B
4,516,537 5/1985 Nakahara et al. .......... 123/78 AA
4,572,116 2/1986 Hedelin ..................... 123/78 D

FOREIGN PATENT DOCUMENTS 0114625 9/1979 Japan ..................... 123/78 D

Primary Examiner—David A. Okonsky
Attorney, Agent, or Firm—Beveridge, DeGrandi & Weilacher

[57] ABSTRACT

A variable compression engine has a cylindrical sub-compression chamber formed in its cylinder head to communicate with the combustion chamber and having a variable inner volume adjustable by a piston slidably fitted therein and being controllably actuatable by an actuator activatable by a control signal generated by a control unit in accordance with the operational conditions of the engine as monitored by pertinent sensors producing respective detection signals which are fed as inputs into the control unit, which further controls the engine ignition timing. Thus, the compression ratio and the ignition timing can be accurately and positively controlled to obtain maximum torque without occurrence of knocking and to obtain desirable performance features such as reduction of pollutants in the exhaust gas emission and lowering of specific fuel consumption.

1 Claim, 4 Drawing Sheets

ENGINE WITH VARIABLE COMPRESSION RATIO

BACKGROUND OF THE INVENTION

This invention relates generally to engines of the type having combustion chambers in which an air-fuel mixture is ignited at a specific compression ratio to produce driving power. More particularly, the invention relates to an engine of this type in which the compression ratio can be variably set in accordance with the operational conditions of the engine.

It has been known that increasing the compression ratio of an engine of the general character described above results in an increase in the engine output. However, if this compression ratio is increased to a greater value than necessary, so-called knocking tends to occur at a transient time such as that during rapid acceleration, during high-speed, high load operation, or, in the case of a supercharged engine, during operation in the supercharging zone. Accordingly, in an engine of constant compression ratio, it is necessary to set this compression ratio in a restricted region in which it will not cause knocking. As a consequence, not only is the engine output at the time of normal operation subject relatively to a limitation, but the possibility of knocking becomes an obstruction to the realization of reduction in the fuel consumption.

For example, in Japanese Utility Model Laid-Open Publication No. 159746/1984 is disclosed a so-called variable compression ratio engine in which a subcompression chamber is formed to communicate with the combustion chamber of each cylinder and to slidably accommodate an adjusting piston which is actuated to advance and retract in accordance with the engine operational conditions, whereby the compression ratio, in response to an output signal of a knocking sensor, can be varied and set within a range wherein maximum torque can be obtained without occurrence of knocking.

The phenomenon of knocking is thought to be caused by a pressure vibration accompanying a rapid combustion of the end gas. Therefore, in an engine wherein, as in the above described prior art, the optimum compression ratio for each operation zone is obtained from feedback controlled by detecting the engine knocking, an abnormality in the compression pressure cannot be detected, even in the case where the combustion pressure within the combustion chamber rises suddenly, until knocking occurs. Thus, there is a limit to positively controlling the compression ratio in a zone wherein maximum torque can be obtained without occurrence of knocking.

As a measure for preventing knocking, the method of controlling the ignition timing has been widely adopted in general. However, similarly as described above, the occurance of knocking is detected by means of a knocking sensor, whereby there is a limit to bringing the ignition timing very close to the minimum ignition advance angle at which maximum torque can be obtained, and it is difficult to fully realize the potential of the engine.

SUMMARY OF THE INVENTION

In view of the above described circumstances in the prior art, it is an object of this invention to provide a variable compression ratio engine in which the compression ratio and ignition timing are positively and precisely controlled, and the full potential of the engine can be amply exhibited without causing knocking, and in which, moreover, reduction of pollutant emission in the exhaust gas, reduction of specific fuel consumption, and improvement of drivability are attained.

According to this invention there is provided, in a variable compression ratio engine wherein an adjusting piston is slidably fitted in a subcompression chamber communicating with a combustion chamber of the engine and is actuatable by an actuator activatable in response to an activation signal outputted by control means in accordance with the operational state of the engine, said control means comprising: a basic compression ratio computing component for computing a basic compression ratio from the engine rotational speed and the intake air pressure; an indicated mean effective pressure computing component for computing the indicated mean effective pressure from the detection signal outputted from a cylinder interior pressure sensor; a knocking detecting component for detecting knocking from said detection signal outputted from said cylinder interior pressure sensor; an ignition timing computing component operable at the time of high load operation, in accordance with the computation output signal of said indicated mean effective pressure computing component, to compute the ignition advance angle, and, at the same time, to correct said ignition advance angle in accordance with the knocking detection signal outputted by said knocking detecting component thereby to derive the actual ignition advance angle; a compression ratio feedback correction quantity computing component for comparing the minimum ignition advance angle for obtaining maximum torque from the output signal of said indicated mean effective pressure computing component with the ignition advance angle computed by said ignition timing computing component and computing the feedback correction value with respect to the basic compression ratio computed by said basic compression ratio computing component; and a compression ratio computing component for correcting said basic compression ratio according to said feedback correction value and computing an activation signal for activating the actuator.

The nature, utility, and further features of this invention will be more clearly apparent from the following detailed description with respect to a preferred embodiment of the invention when read in conjunction with the accompanying drawings, briefly described below.

BRIEF DESCRIPTION OF THE DRAWINGS

In the accompanying drawings

DETAILED DESCRIPTION OF THE INVENTION

Figure 1:
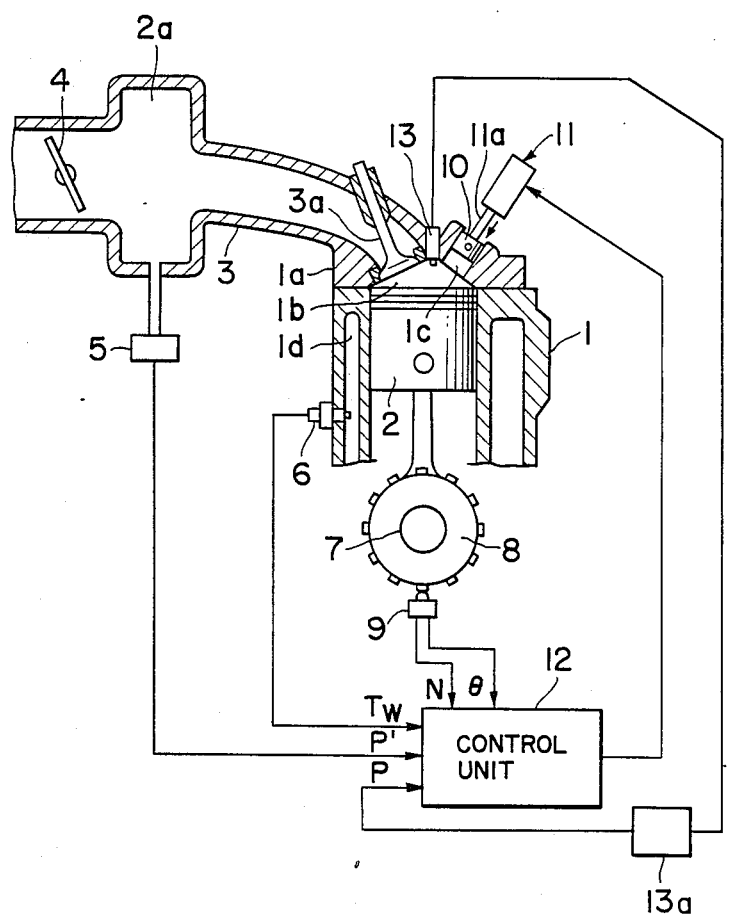
FIG. 1 is a partial schematic diagram showing the essential organization of one example of a variable compression ratio engine according to this invention.
Figure 2:
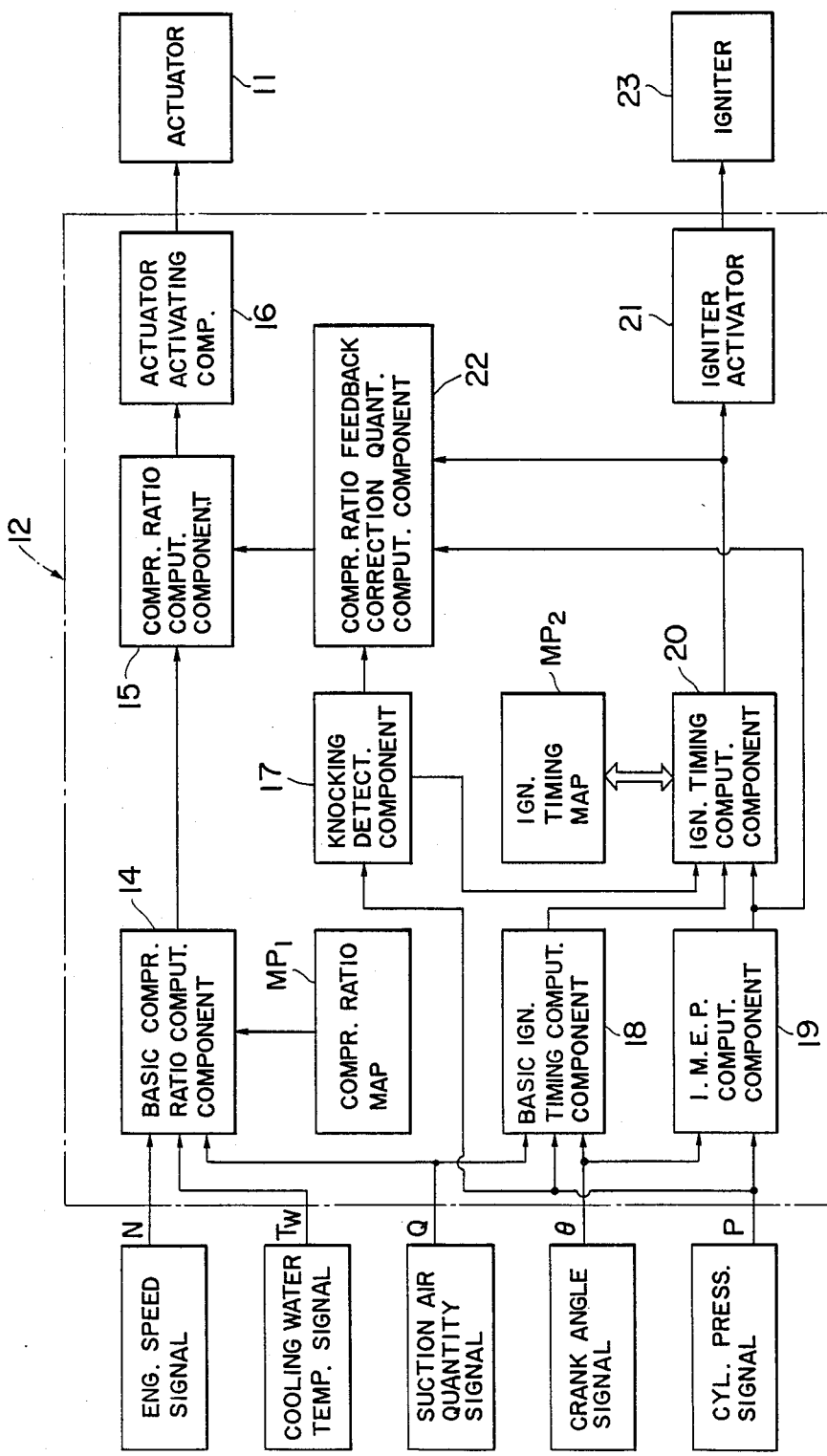
FIG. 2 is a block diagram showing an example of organization of elements in a control unit of the engine.

Referring first to FIG. 1, an engine is illustrated partially therein as an engine main structure or cylinder block 1, a cylinder head 1a and a piston 2, which form a combustion chamber 1b. A cylinder interior pressure sensor 13 is provided in the cylinder head 1a.

An intake or suction pipe 3 is connected at its downstream end to the cylinder head 1a to communicate with the combustion chamber head 1b via an intake valve 3a and is provided with a throttle valve 4. The suction pipe 3 is further provided immediately downstream from the throttle valve 4 with an air chamber 2a, which is provided with a pressure sensor 5 for detecting the pressure therewithin. The engine main structure 1 has a water jacket 1d provided with a cooling water temperature sensor 6. The piston 2 is connected via a connecting rod to the crankshaft 7, to which is fixed a signal disk plate 8, and an engine rotational speed sensor 9 is disposed to confront this signal disk plate 8.

The cylinder head 1a is provided with a cylindrical subcompression chamber 1c communicating with the combustion chamber 1b. An adjusting piston 10 is slidably fitted in this subcompression chamber 1c and is connected to the outer end of a plunger 11a of an actuator 11 to be actuatable thereby to vary the volume of the combustion chamber 1b and therefore the compression ratio as described hereinafter. The operation of the actuator 11 is controlled by control means in the form of an electronic control unit 12.

The control unit 12 is connected on its input side to the above mentioned sensors, namely, the pressure sensor 5, the cooling water temperature sensor 6, the engine rotational speed sensor 9, and the cylinder interior pressure sensor 13. Thus, to the control unit 12 are transmitted: an intake air pressure signal P' from the pressure sensor 5; a cooling water temperature signal Tw from the water temperature sensor 6; a rotational speed signal N and a crank angle signal $\theta$ from the speed sensor 9; and a cylinder interior pressure signal P from the pressure sensor 13 by way of a charge amplifier 13a. Furthermore, the output side of the control unit 12 is connected to the plunger actuating coil (not shown) of the actuator 11.

The control unit 12 comprises essentially: a basic compression ratio computing component 14; a compression ratio computing component 15; an actuator activating component 16; a knocking detecting component 17; a basic ignition timing computing component 18; an indicated mean effective pressure (i.m.e.p.) computing component 19; an ignition timing computing component 20; an igniter activating component 21; and a compression ratio feedback correction quantity computing component 22.

The basic compression ratio computing component 14 derives the basic compression ratio, on the basis of the engine speed N, the intake air pressure P', and the cooling water temperature Tw, from a compression ratio map MP1 determined previously by an empirical procedure such as experiments.

In this compression ratio map MP1 are provided compression ratio maps which have been plurally divided according to the cooling water temperature Tw. From these, one compression ratio map corresponding to the cooling water temperature Tw is selected. Then, from the intake air pressure P' and the engine speed N, a compression ratio coefficient stored in a pertinent area within the selected compression ratio map is derived, and the basic compression ratio is computed from this compression ratio coefficient.

The knocking detecting component 17 operates to read an indicator pressure waveform from the cylinder interior pressure signal P detected by the cylinder interior pressure sensor 13 and to detect the occurance of knocking. The result of this detection is transmitted to the ignition timing computing component 20 and to the compression ratio feedback correction quantity computing component 22.

The basic ignition timing computing component 18 operates to compute the basic ignition advance angle representing to the load at the present operation time from the intake air pressure P' and the measured value of the cylinder interior pressure from P the cylinder interior pressure sensor 13.

In the indicated mean effective pressure (i.m.e.p.) computing component 19, both the top dead center and the crankshaft rotational angle to become a reference are determined from the crank angle signal $\theta$ supplied by the crank angle sensor 9, and, with the cylinder interior pressure P from the cylinder interior pressure sensor 13 and the crankshaft rotational angle from the top dead center, the indicated mean effective pressure Pi for each cycle is computed.

The indicated mean effective pressure Pi in the case of a four-stroke cycle engine can be determined from the following equation.

$$Pi = \frac{1}{Vh} \cdot \sum_{\theta=0}^{4\pi} P \cdot V\theta,$$

where:

Vh is the stroke (displacement) volume;

$\theta$ is the crankshaft rotational angle before top dead center;

P is the cylinder pressure at each rotational angle; and

V$\theta$ is the variation of cylinder volume at each rotational angle.

That is, the volumetric variation of the cylinder is computed from the crank angle signal $\theta$ detected by the crank angle sensor 9. When there is a variation in the volumetric variation V$\theta$, the cylinder pressure P is measured from the signal of the cylinder pressure sensor 13, and this cylinder pressure P and the cylinder volume variation V$\theta$ is successively multiplied. Then, by dividing the sum for each cycle by the displacement volume Vh, the indicated mean effective pressure Pi is computed.

In the ignition timing computing component 20, the basic ignition advance angle computed by the basic ignition timing computing component 18 is corrected on the basis of the indicated mean effective pressure Pi and the knocking detection signal from the knocking detecting component 17, and the actual ignition advance angel is computed. The advance angle thus computed is written in the pertinent area of an ignition timing map MP2 to replace the previously written ignition advance angle value.

At the same time, from this ignition timing computing component 20, an output signal is transmitted on the basis of an ignition advance angle value already stored in a pertinent area of the ignition timing map MP2 to the igniter activating component 21, which thereupon transmits an ignition signal to an igniter 23. Then in the case where knocking is detected with this actual ignition advance angle, the ignition angle is retarded and set to an ignition advance angle before occurrence of knocking.

Furthermore, in the compression ration feedback correction quantity computing component 22, a compression ratio feedback correction value is computed from the indicated mean effective pressure Pi, the output signal transmitted from the ignition timing computing component 20 to the igniter activating component 21, and the knocking detection signal from the knocking detecting component 17.

Figure 3:
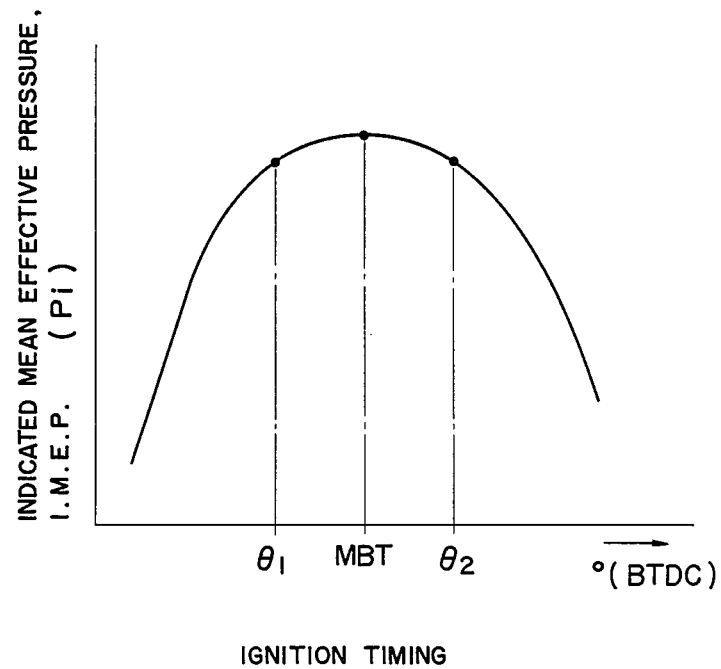
FIG. 3 is a graph indicating a relationship between indicated mean effective pressure (Pi) and ignition timing in terms of degrees of angle before top dead center, (BTDC)

That is, as indicated at the ignition advance angle $\theta1$ in FIG. 3, in the case where, when the ignition angle is advanced, knocking is detected, and moreover the indicated mean effective pressure rises, it is determined that the minimum ignition advance angle (MBT) for obtaining maximum torque is not being attained, and the appropriate correction value for lowering the compression ratio is computed.

On the other hand, in the case where, as indicated at the ignition advance angle MBT in FIG. 3, when the ignition angle is advanced, knocking is detected, and there is no fluctuation in the indicated mean effective pressure, it is determined that MBT is being attained, and a signal for maintaining the present compression ratio is transmitted to the compression ratio computing component 15.

In the case where, the indicated mean effective pressure Pi decreases when the ignition angle is advanced, as indicated at ignition advance angle $\theta2$ in FIG. 3, it is determined that the angle is advanced beyond MBT, a correction value for increasing the compression ratio so as to obtain maximum torque is computed.

In the compression ratio computing component 15, the basic ignition advance angle computed in the basic compression ratio computing component 14 is subjected to correction computation on the basis of the compression ratio feedback correction value from the compression ratio feedback correction quantity computing component 22, and a control signal is transmitted to the actuator activating component 16, which thereupon transmits an operational signal to the coil of the actuator 11.

Figure 4:
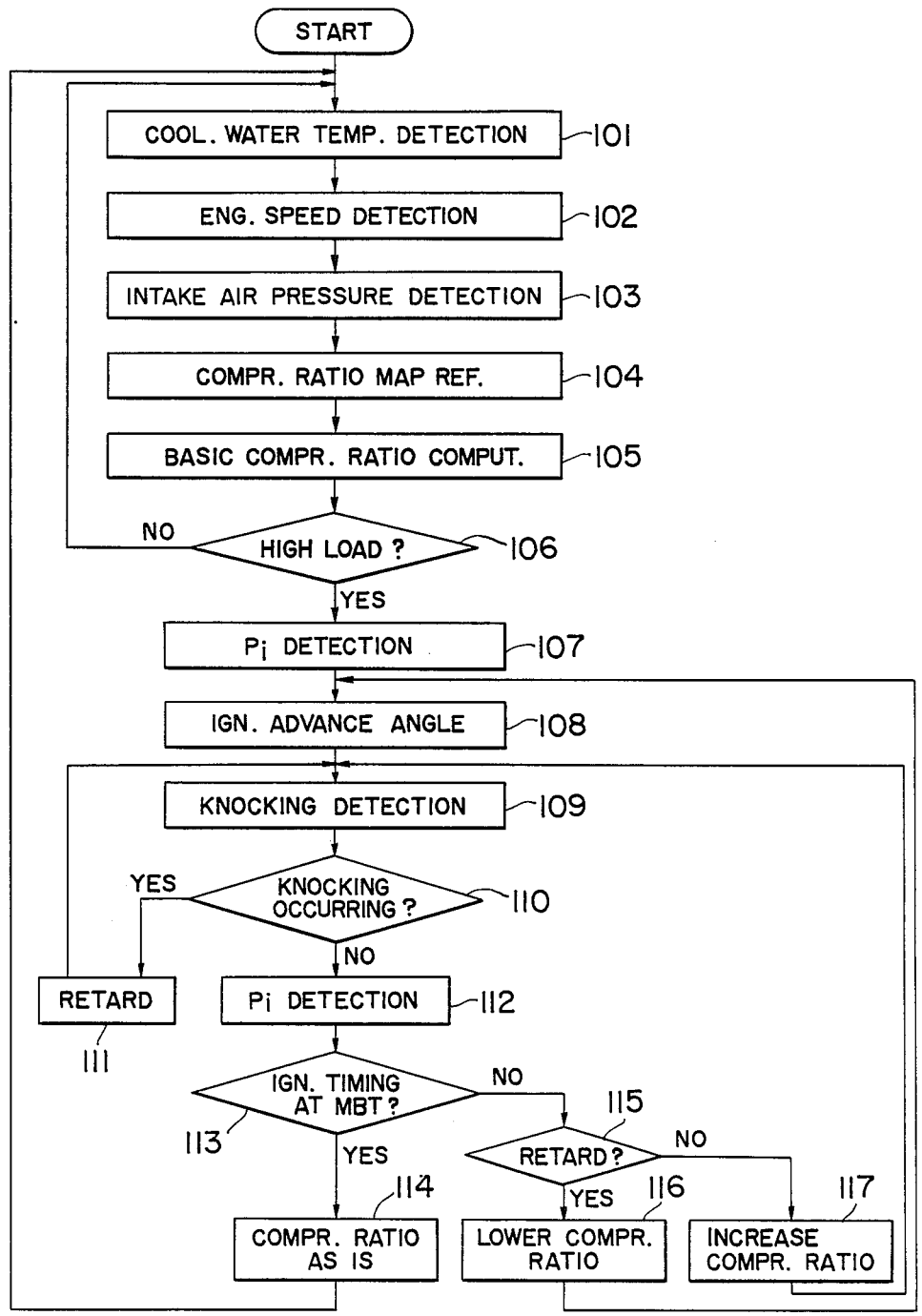
FIG. 4 is a flow chart indicating the successive procedure of control.

Next, the sequential procedure of control by the control unit 12 will be described in conjunction with the flow chart of FIG. 4.

First, in step 101, the cooling water temperature Tw is detected; in step 102, the engine rotational speed N is detected; and in step 103, the intake air pressure P' is detected.

Then, in step 104, one compression ratio map is selected from the compression ratio maps divided plurally on the basis of the cooling water temperature Tw.

In the successive step 105, from the intake air pressure P' and the engine speed N, the compression ratio coefficient stored in the pertinent area within the compression ratio map is extracted, and, on the basis thereof, the basic compression ratio is determined.

In the next step 106, the state of the engine load is determined from the intake air pressure P', and, in the case of high load, the procedure proceeds to step 107, whereas in other cases, it returns to step 101.

In step 107, the indicated mean effective pressure Pi is detected, and in step 108, the basic ignition advance angle is corrected on the basis of this pressure Pi thereby to determine the actual ignition advance angle.

The procedure then progresses to step 109, in which knocking is detected by the knocking detecting component 17. Then, in step 110, the occuring or nonoccuring of knocking is determined, and, when knocking occurs, the ignition is retarded in step 111, after which the procedure returns to step 109. In the case where knocking has not occurred, the procedure advances to step 112, and the indicated mean effective pressure Pi is again detected.

Then in step 113, from this pressure Pi, it is determined whether or not the ignition timing is at MBT. In the case where it is at MBT, the compression ratio is left as it is (step 114), and the procedure returns to step 101. In the case where the ignition timing is not coincident with MBT, the procedure proceeds to step 115, where retarding or advancing is determined. In the case of retarding, the compression ratio is lowered (step 116), and the procedure returns to step 108. In the case of advancing, the compression ratio is increased (step 117), and the procedure returns to step 109.

By a repetition of this process, the indicated mean effective pressure Pi, that is, the ignition timing and the compression ratio are controlled so as to obtain maximum torque.

According to this invention as described above, by controlling accurately and positively the compression ratio and the ignition timing of an engine, the full potential of the engine can be amply exhibited within a maximum range wherein knocking does not occur, and, moreover, excellent performance features such as reduction of pollutants in the exhaust gas emission and improvement of specific fuel consumption and drivability can be attained.

What is claimed is:

1. In a variable compression ratio engine wherein an adjusting piston is slidably fitted in a subcompression chamber communicating with a combustion chamber of the engine and is actuatable by an actuator activatable in response to an activation signal outputted by control means in accordance with the operational state of the engine, said control means comprising:

a basic compression ratio computing component for computing a basic compression ratio from an engine rotational speed and an intake air pressure;

an indicated mean effective pressure computing component for computing the indicated mean effective pressure from the detection signal outputted from a cylinder interior pressure sensor;

a knocking detecting component for detecting knocking from said detection signal outputted from said cylinder interior pressure sensor;

an ignition timing computing component operable at the time of high load operation, in accordance with the computation output signal of said indicated mean effective pressure computing component, to compute the ignition advance angle, and, at the same time, to correct said ignition advance angle in accordance with a knocking detection signal outputted by said knocking detecting component thereby to derive the actual ignition advance angle;

a compression ratio feedback correction quantity computing component for comparing the minimum ignition advance angle for obtaining maximum torque from the output signal of said indicated mean effective pressure computing component with the ignition advance angle computed by said ignition timing computing component and computing the feedback correction value with respect to the basic compression ratio computed by said basic a compression ratio computing component; and a compression ratio computing component for correcting said basic compression ratio according to said feedback correction value and computing said activation signal with respect to said actuator.

* * * * *